United States Patent
Dhanasekaran

(10) Patent No.: US 11,552,434 B2
(45) Date of Patent: Jan. 10, 2023

(54) OVERVOLTAGE PROTECTION SCHEME FOR CONNECTOR PORTS

(71) Applicant: QUALCOMM Incorporated, San Diego, CA (US)

(72) Inventor: Vijayakumar Dhanasekaran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/325,463

(22) Filed: May 20, 2021

(65) Prior Publication Data
US 2021/0367383 A1 Nov. 25, 2021

Related U.S. Application Data

(60) Provisional application No. 63/029,322, filed on May 22, 2020.

(51) Int. Cl.
*H01R 13/713* (2006.01)

(52) U.S. Cl.
CPC .................................. *H01R 13/713* (2013.01)

(58) Field of Classification Search
CPC ....... H01R 13/713; H02H 9/041; H02H 3/202
USPC ........................................................ 361/91.1
See application file for complete search history.

(56) References Cited

U.S. PATENT DOCUMENTS

| | | | | |
|---|---|---|---|---|
| 2006/0061341 A1* | 3/2006 | Wang | ................. | H02M 3/1588 323/282 |
| 2008/0186644 A1* | 8/2008 | Migliavacca | ........... | G05F 1/571 361/86 |
| 2009/0091872 A1* | 4/2009 | Ueda | ................... | H01L 27/0285 361/91.1 |
| 2009/0115390 A1* | 5/2009 | Chen | ...................... | H02M 1/32 323/283 |
| 2015/0026486 A1* | 1/2015 | Liu | ........................... | G06F 1/26 713/300 |
| 2016/0072322 A1* | 3/2016 | Yoshimatsu | ...... | H02J 7/007182 361/86 |
| 2017/0155214 A1 | 6/2017 | Shen et al. | | |
| 2018/0374705 A1 | 12/2018 | Dhanasekaran et al. | | |
| 2019/0064862 A1* | 2/2019 | Pan | ........................ | G05F 1/561 |
| 2020/0014294 A1* | 1/2020 | Song | ..................... | H02M 3/158 |
| 2020/0036182 A1* | 1/2020 | Hanson | ..................... | H02H 3/22 |

(Continued)

OTHER PUBLICATIONS

International Search Report and Written Opinion—PCT/US2021/033741—ISA/EPO—dated Sep. 22, 2021.

*Primary Examiner* — Dharti H Patel
(74) *Attorney, Agent, or Firm* — Patterson & Sheridan, LLP

(57) ABSTRACT

Certain aspects of the present disclosure generally relate to methods and apparatus for providing overvoltage protection for circuitry coupled to connector ports, such as USB-C ports. One example circuit for overvoltage protection between a connector port and a signal node corresponding to the connector port generally includes a first switch having a first terminal for coupling to the connector port and having a second terminal for coupling to the signal node; a first resistive element coupled in parallel with the first switch; a first transient protection circuit coupled between the signal node and a reference potential node; and a control circuit having an input coupled to the signal node and having a first output coupled to a control input of the first switch.

19 Claims, 6 Drawing Sheets

(56) References Cited

U.S. PATENT DOCUMENTS

2020/0112167 A1    4/2020  Jang et al.
2020/0125519 A1*   4/2020  Pan .................... G06F 13/4022

* cited by examiner

OVERVOLTAGE PROTECTION SCHEME FOR CONNECTOR PORTS

CROSS-REFERENCE TO RELATED APPLICATION

This application claims benefit of and priority to U.S. Provisional Application No. 63/029,322, filed May 22, 2020, which is hereby expressly incorporated by reference herein in its entirety as if fully set forth below and for all applicable purposes.

BACKGROUND

Field of the Disclosure

Certain aspects of the present disclosure generally relate to electronic circuits and, more particularly, to overvoltage protection circuits and techniques.

Description of Related Art

Electronic circuits are designed to operate with certain maximum voltages at different nodes therein. When the voltage at a circuit node exceeds the maximum voltage limit, this condition is known as overvoltage and may be harmful to the circuit. An overvoltage event can be constant (e.g., a direct current (DC) overvoltage) or transient (e.g., a voltage spike). Overvoltage protection devices may be used to protect the circuit against overvoltage events.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description," one will understand how the features of this disclosure provide advantages that include circuitry that provides overvoltage protection for a connector port and can be desirably scaled for multiple connector ports.

Certain aspects of the present disclosure generally relate to techniques and apparatus for providing overvoltage protection for circuitry coupled to connector ports, such as USB or USB-C ports.

Certain aspects of the present disclosure provide a circuit for overvoltage protection (OVP) between a connector port and a signal node corresponding to the connector port. The OVP circuit generally includes a first switch having a first terminal for coupling to the connector port and having a second terminal for coupling to the signal node; a first resistive element coupled in parallel with the first switch; a first transient protection circuit coupled between the signal node and a reference potential node; and a control circuit having an input coupled to the signal node and having a first output coupled to a control input of the first switch.

Certain aspects of the present disclosure provide a method of providing overvoltage protection between a connector port and a signal node corresponding to the connector port. The method generally includes suppressing a first voltage at the signal node to a second voltage with a first transient protection circuit, in response to the first voltage exceeding a clamping voltage of the first transient protection circuit, wherein the first transient protection circuit is coupled between the signal node and a reference potential node. The method also includes comparing, with a control circuit, the second voltage with a reference voltage, the control circuit having an input coupled to the signal node and having a first output coupled to a control input of a first switch, wherein the first switch has a first terminal coupled to the connector port, has a second terminal coupled to the signal node, and is coupled in parallel with a first resistive element. The method further includes opening the first switch with the control circuit based on the comparison.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
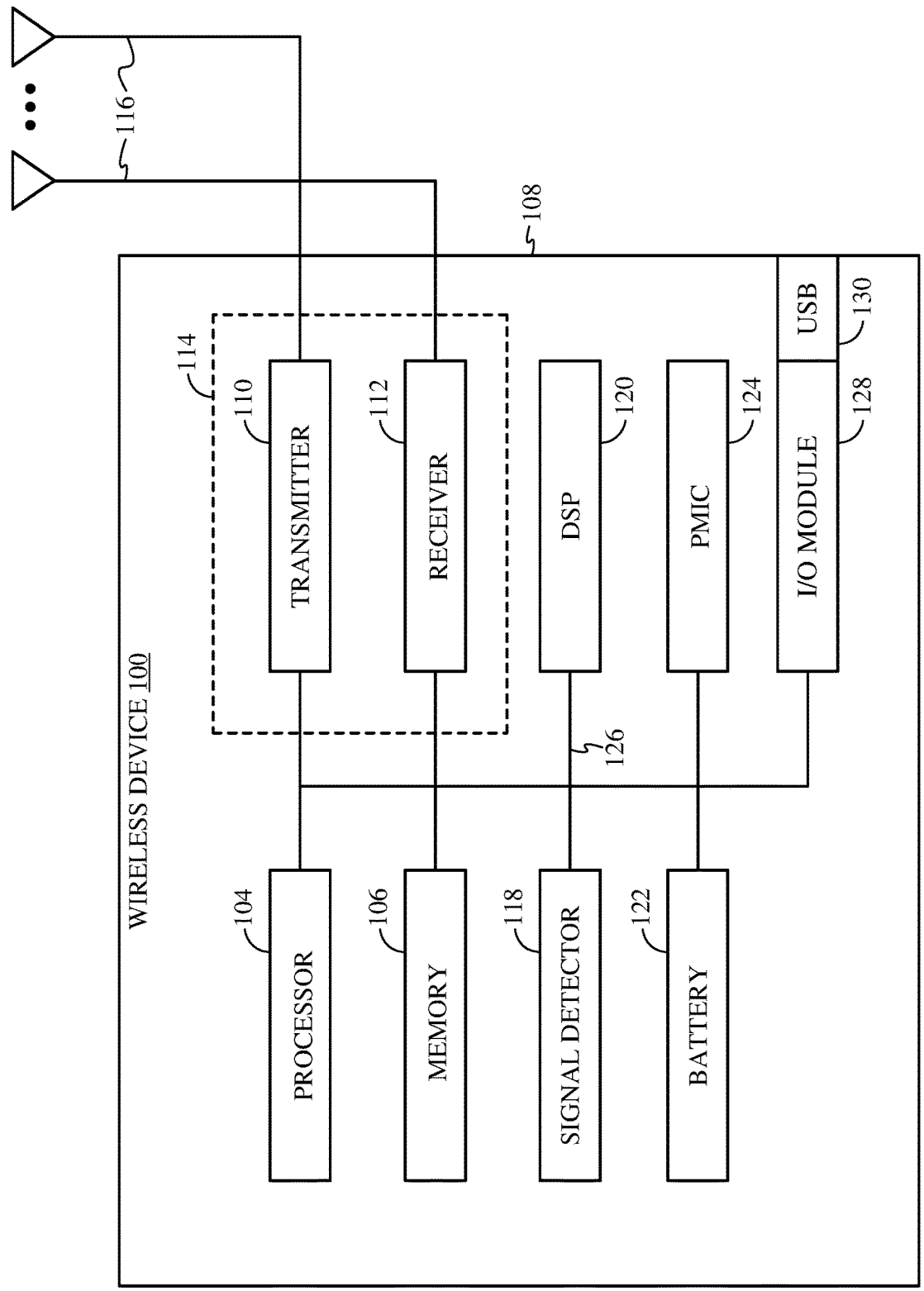
FIG. 1 illustrates a block diagram of an example device that includes an overvoltage protection (OVP) circuit, in accordance with certain aspects of the present disclosure.

Certain aspects of the present disclosure provide an overvoltage protection circuit (OVP) and techniques for overvoltage protection. Certain devices that have an input-output (I/O) connector (such as a Universal Serial Bus (USB) Type-C receptacle) may employ various OVP schemes to prevent electrical over stress (EOS) damage to integrated circuits (ICs) coupled to the I/O connector. Certain OVP schemes may be too complex and/or expensive to provide OVP for multiple pins on the I/O connector. Certain aspects of the present disclosure provide OVP techniques and apparatus that are relatively cheaper (in terms of cost and board area), provide suitable transient and DC overvoltage protection, and offer lower pin/trace count, than other OVP schemes described herein.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

As used herein, the term "connected with" in the various tenses of the verb "connect" may mean that element A is directly connected to element B or that other elements may be connected between elements A and B (i.e., that element A is indirectly connected with element B). In the case of electrical components, the term "connected with" may also be used herein to mean that a wire, trace, or other electrically conductive material is used to electrically connect elements A and B (and any components electrically connected therebetween).

An Example Device

It should be understood that aspects of the present disclosure may be used in a variety of applications. Although the present disclosure is not limited in this respect, the circuits disclosed herein may be used in many apparatuses, such as in a computer, a communication system, a television, audio equipment such as music players and microphones, camera equipment, and test equipment. Communication systems intended to be included within the scope of the present disclosure include, by way of example only, cellular radiotelephone communication systems, satellite communication systems, two-way radio communication systems, one-way pagers, two-way pagers, personal communication systems (PCS), personal digital assistants (PDAs), and the like.

FIG. 1 illustrates an example device 100 in which aspects of the present disclosure may be implemented. The device 100 may be a battery-operated device such as a cellular phone, a PDA, a handheld device, a wireless device, a laptop computer, a tablet, a smartphone, a wearable device, etc.

The device 100 may include a processor 104 that controls operation of the device 100. The processor 104 may also be referred to as a central processing unit (CPU). Memory 106, which may include both read-only memory (ROM) and random access memory (RAM), provides instructions and data to the processor 104. A portion of the memory 106 may also include non-volatile random access memory (NVRAM). The processor 104 typically performs logical and arithmetic operations based on program instructions stored within the memory 106.

In certain aspects, the device 100 may also include a housing 108 that may include a transmitter 110 and a receiver 112 to allow transmission and reception of data between the device 100 and a remote location. For certain aspects, the transmitter 110 and receiver 112 may be combined into a transceiver 114. One or more antennas 116 may be attached or otherwise coupled to the housing 108 and electrically connected to the transceiver 114. The device 100 may also include (not shown) multiple transmitters, multiple receivers, and/or multiple transceivers.

The device 100 may also include a signal detector 118 that may be used in an effort to detect and quantify the level of signals received by the transceiver 114. The signal detector 118 may detect such signal parameters as total energy, energy per subcarrier per symbol, and power spectral density, among others. The device 100 may also include a digital signal processor (DSP) 120 for use in processing signals.

The device 100 may further include a battery 122 used to power the various components of the device 100. The device 100 may also include a power management integrated circuit (power management IC or PMIC) 124 for managing the power from the battery to the various components of the device 100. The PMIC 124 may perform a variety of functions for the device such as direct current (DC)-to-DC conversion, battery charging, power-source selection, voltage scaling, power sequencing, etc. In certain aspects, the PMIC 124 may include a battery charging circuit (e.g., a master-slave battery charging circuit) or other switched-mode power supply. The various components of the device 100 may be coupled together by a bus system 126, which may include a power bus, a control signal bus, and/or a status signal bus in addition to a data bus.

For certain aspects, the device 100 may have an input/output (I/O) module 128 for receiving and/or outputting data and/or power. In certain aspects, the I/O module 128 may include a connector 130, such as a Universal Serial Bus (USB) Type-A (USB-A) receptacle or a USB Type-C (USB-C) receptacle. The pins of the connector 130 may be routed to the processor 104 and/or the PMIC 124 via signal lines of the bus system 126 and/or the I/O module 128, at least some of which may include an overvoltage protection circuit, as further described herein.

Example Overvoltage Protection Circuit

Figure 2:
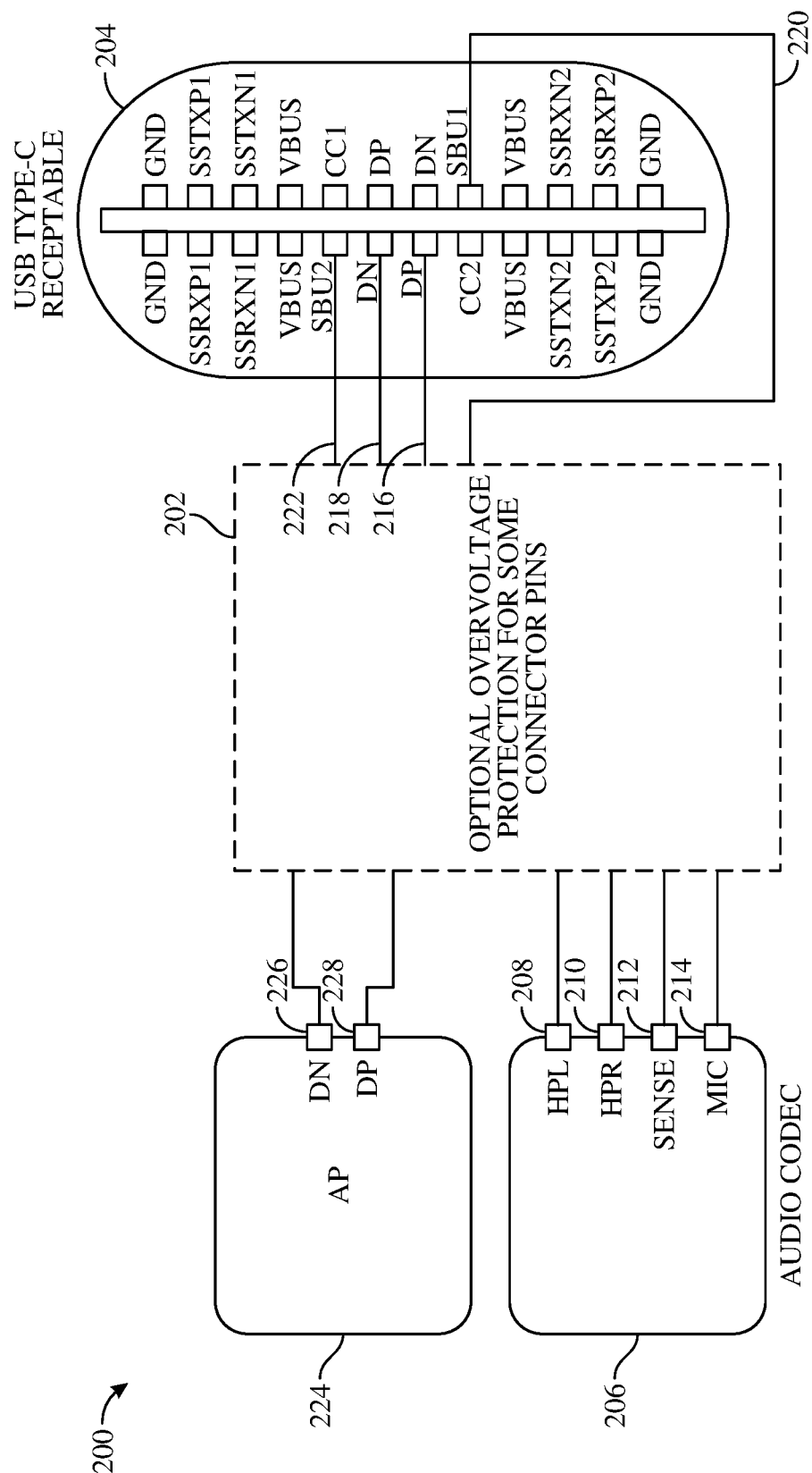
FIG. 2 is an example block diagram illustrating various components being connected to a connector receptacle via optional OVP for some connector pins.

DC overvoltage and surge voltage fault conditions may occur at one or more pins of a connector, such as a USB-A or USB-C receptacle, of a device (e.g., device 100). An overvoltage protection (OVP) scheme may be employed, as illustrated in the block diagram 200 of FIG. 2, to prevent electrical over stress (EOS) damage to chipset integrated circuits (ICs) having various signal nodes for coupling to the connector pins. For example, an OVP scheme 202 may be implemented between certain pins of a USB-C port 204 and a pin of an audio encoder/decoder (codec) 206 used for an analog headphone audio output (e.g., the headphone left (HPL) pin 208 or headphone right (HPR) pin 210) or input (e.g., the sense pin 212 or the microphone (MIC) pin 214). As additional examples, in addition to bus power ($V_{BUS}$) pins, customers may desire a differential pair positive (DP) pin 216 (e.g., Dp1 or Dp2), a differential pair negative (DN) pin 218 (e.g., Dn1 or Dn2), and/or a sideband use (SBU) pin (e.g., SBU1 220 or SBU2 222) to tolerate high voltages (e.g., ±20 V), due to various fault conditions (such as a short circuit to $V_{BUS}$, which can reach 20 V in some cases). In certain cases, the OVP scheme 202 may be implemented between the DP and DN pins 216, 218 of the USB-C port 204 and pins (e.g., the counterpart DP and DN pins 226, 228) of an application processor 224 used for running applications in an operating system. Due to higher numbers of pins to protect and signal integrity concerns, it may be desirable to minimize, or at least reduce, the number of control pins and traces involved to implement an OVP scheme.

One example OVP scheme uses a separate, external IC to implement USB data/audio switches between the connector (e.g., the USB-C receptacle) and the chipset ICs. This external IC also provides built-in OVP on certain signal lines. However, such an external IC is an expensive solution, in terms of both cost and board area.

Another example OVP scheme works for surge protection (e.g., transient surges) where finite charge can be discharged to prevent high voltage at an IC pin. However, the circuit implementing this surge-protection scheme does not protect the IC from high DC voltage due to extremely large power dissipation when the circuit tries to clamp DC voltage with low resistance.

Yet another OVP scheme offers external field-effect transistor (FET)-based protection, where an external FET is used as a switch between the connector port and the signal line. In this scheme, a control circuit senses the voltage at the connector port and controls the FET switch based on the sensed voltage. This is a much cheaper solution compared to an external protection IC. However, this scheme entails using two pins (e.g., OVP drive and OVP sense) and corresponding traces ("wires") per connector pin designated for overvoltage protection. As described above, it may be desirable to minimize, or at least reduce, the number of control pins and traces involved to implement an OVP scheme, due to the relatively high number of pins to protect for USB-C and signal integrity concerns.

Certain aspects of the present disclosure provide OVP techniques and apparatus that are relatively cheaper (in terms of cost and board area), provide suitable transient and DC overvoltage protection, and offer lower pin/trace count, than the example OVP schemes described herein above. The OVP techniques and apparatus described herein may enable OVP for multiple pins of a connector at a desirable cost and area.

Figure 3:
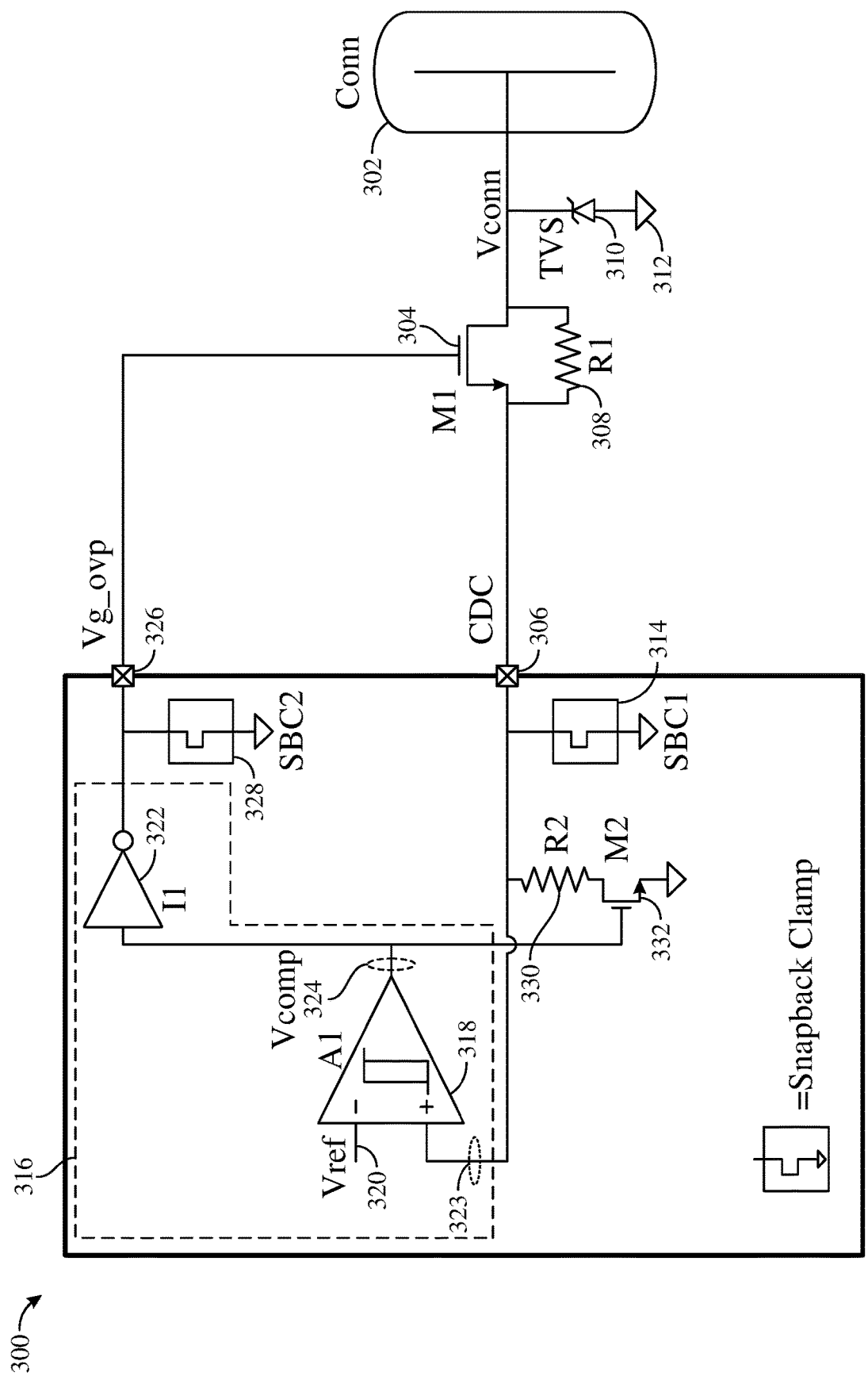
FIG. 3 is a circuit diagram of an example OVP circuit, in accordance with certain aspects of the present disclosure.

FIG. 3 is a circuit diagram of an example OVP circuit 300, in accordance with certain aspects of the present disclosure. While FIG. 3 illustrates the OVP circuit for a single connector port 302 (such as the DP pin 216), it is to be understood that the OVP circuit may be replicated for other ports (such as the DN pin 218, SBU1 220, and/or SBU2 222) of the connector. The connector port 302 may be a USB-C port, such as the DP pin 216, the DN pin 218, SBU1 220, and/or SBU2 222.

The OVP circuit 300 may include a switch 304 connected between the connector port 302 (e.g., a DP, DN, or SBU port, having a voltage labeled "Vconn") and the signal node 306 (labeled "CDC," which refers to the connector DC voltage) corresponding to—or intended for carrying a signal to or from—the connector port. In aspects, the switch 304 may have a first terminal (e.g., a drain) for coupling to the connector port 302 and a second terminal (e.g., a source) for coupling to the signal node 306. The OVP circuit 300 may lack a sense line coupled to a node between the first terminal of the switch 304 and the connector port 302. Without the sense line, the OVP circuit 300 may provide a desirable trace count and area, which in turn may provide a desirable fabrication cost. The switch 304 may be implemented by a transistor, such as an n-type metal-oxide-semiconductor field-effect transistor (n-MOSFET or NMOS transistor) M1. The switch 304 may be closed during normal operation (such as when the voltage of the signal node is within normal operating voltages) and open during an overvoltage event as further described herein with respect to FIG. 4. In aspects, the NMOS transistor M1 may have a suitable breakdown voltage for providing overvoltage protection, such as a breakdown voltage of at least 20 V. A resistor 308 (having resistance "R1") may be connected in parallel with the switch 304. Resistor 308 may have a suitable resistance to provide a voltage drop between the connector port 302 and the signal node 306 during an overvoltage event, as further described herein with respect to FIG. 4. As an example, resistor 308 may have a resistance of 20 kΩ.

The OVP circuit 300 may also include a transient voltage suppressor (TVS) 310, which may be implemented by a transient-voltage suppression diode (e.g., a unidirectional TVS diode with a clamping voltage of 28 V). The TVS 310 may be coupled in shunt between a node coupled to the connector port 302 (and to the switch 304) and a reference potential node 312 (e.g., electrical ground). The TVS 310 may shunt transient overvoltages to ground when Vconn exceeds the breakdown voltage of the TVS 310.

The OVP circuit 300 may also include a first transient protection circuit 314 coupled between the signal node 306 and the reference potential node 312 (e.g., electrical ground) for the circuit. The first transient protection circuit 314 may be implemented, for example, by a snapback clamp SBC1, as illustrated in FIG. 3, or by other voltage-clamping structures (such as those used for electrostatic discharge (ESD) protection). For example, the first transient protection circuit 314 may be implemented by one or more diodes coupled in series with a resistive element or by one or more diodes in series with a resistive-capacitive (RC) clamp. The first transient protection circuit 314 may provide additional protection against transient overvoltages. The first transient protection circuit 314 may pull overvoltages down (or up depending on the polarity of the overvoltage) to certain holding voltages when the voltage at the signal node 306 exceeds the breakdown voltage of the snapback clamp (e.g., a parasitic bipolar junction transistor (BJT) of an n-MOSFET).

The OVP circuit 300 may further include a control circuit 316. The control circuit 316 may have an input 323 coupled to the signal node 306 and an output 324 coupled to a control input (e.g., a gate) of the switch 304. The control circuit 316 may include a comparator 318 (labeled "A1") for comparing the signal node 306 to a reference voltage (labeled "Vref") at a reference voltage node 320. Vref may be programmable or configurable. For example, Vref may equal 3.3 V before an OVP trigger and may be changed to 30 mV after the trigger. In certain aspects, Vref may be lower than a holding voltage of the first transient protection circuit. For certain aspects, the control circuit 316 may also include an inverter 322 (labeled "I1") coupled between the output 324 of the comparator (having an output voltage labeled "Vcomp") and a control input of the switch 304 (e.g., the gate of the transistor M1, having a voltage labeled "Vg_ovp"). In aspects, the output of the inverter 322 may be considered the first output of the control circuit 316. As there may be a delay in detecting overvoltages by the comparator 318, the first transient protection circuit 314 may pull overvoltages down to a holding voltage until the comparator 318 detects the overvoltage on the signal node 306 and opens the switch 304 (e.g., turns off the transistor M1) as further described herein with respect to FIG. 4.

For certain aspects, the control circuit 316 may have a single output, such as the output of the comparator 318. In this case, the transistor M1 may be implemented as a depletion-mode FET, having a gate coupled to the output of the comparator 318, and the inverter 322 need not be used (i.e., can be replaced by a short circuit).

For certain aspects, the OVP circuit 300 may further include a second transient protection circuit 328 coupled between the control input of the switch 304 and the reference potential node 312. As described above, the second transient protection circuit 328 may be implemented, for example, by a snapback clamp SBC2, as illustrated in FIG. 3, or by one or more diodes coupled in series with a resistive element. The second transient protection circuit 328 may limit voltage at the control input of the switch 304 such that any overvoltage does not leak to the signal node 306.

For certain aspects, the OVP circuit 300 may also include a resistor 330 (having resistance "R2") coupled in series with another switch 332 between the signal node 306 and the reference potential node 312. The other switch 332 may be implemented by an NMOS transistor M2, as illustrated. The control input of the other switch 332 (e.g., the gate of transistor M2) may be coupled to the output 324 of the comparator 318. In certain aspects, the output 324 of the comparator 318 may be considered the second output of the control circuit 316, such that the second output of the control circuit 316 is coupled to the control input of the other switch 332. In certain aspects, the second output of the control circuit 316 may be the same as the first output of the control circuit 316. In other aspects, the second output of the control circuit 316 may be coupled to the first output of the control circuit 316, for example, via the inverter 322. In certain aspects, the resistor 330 may have a resistance R2 of around 300Ω and/or may be adjustable. In certain cases, the resistor 308 may have a first resistance R1 that is greater than a second resistance R2 of the resistor 330 by at least an order of magnitude.

For certain aspects, the switch 304, resistor 308, and the TVS 310 may all be external to an integrated circuit (IC), whereas the other components of the OVP circuit 300 may be internal to the IC. For example, the signal node 306 may include a pin of the IC. The OVP circuit 300 may include only a single additional pin 326 of the IC for the overvoltage protection of the connector port 302, where the single additional pin 326 is coupled between the output of the control circuit 316 and the control input of the switch 304. That is, the IC may have two pins for the overvoltage protection of the connector port 302: a pin for the signal node 306 and another pin 326 for the control input of the switch 304. These two pins may provide a desirable trace count and area of the IC, which in turn may provide a desirable fabrication cost of the IC. In certain aspects, the IC may be a system-on-a-chip (SoC), for example, including the application processor 224, the audio codec 206, and the internal components of the OVP circuit 300 (such as the first transient protection circuit 314, the control circuit 316, the second transient protection circuit 328, the resistor 330, and/or the other switch 332).

Figure 4:
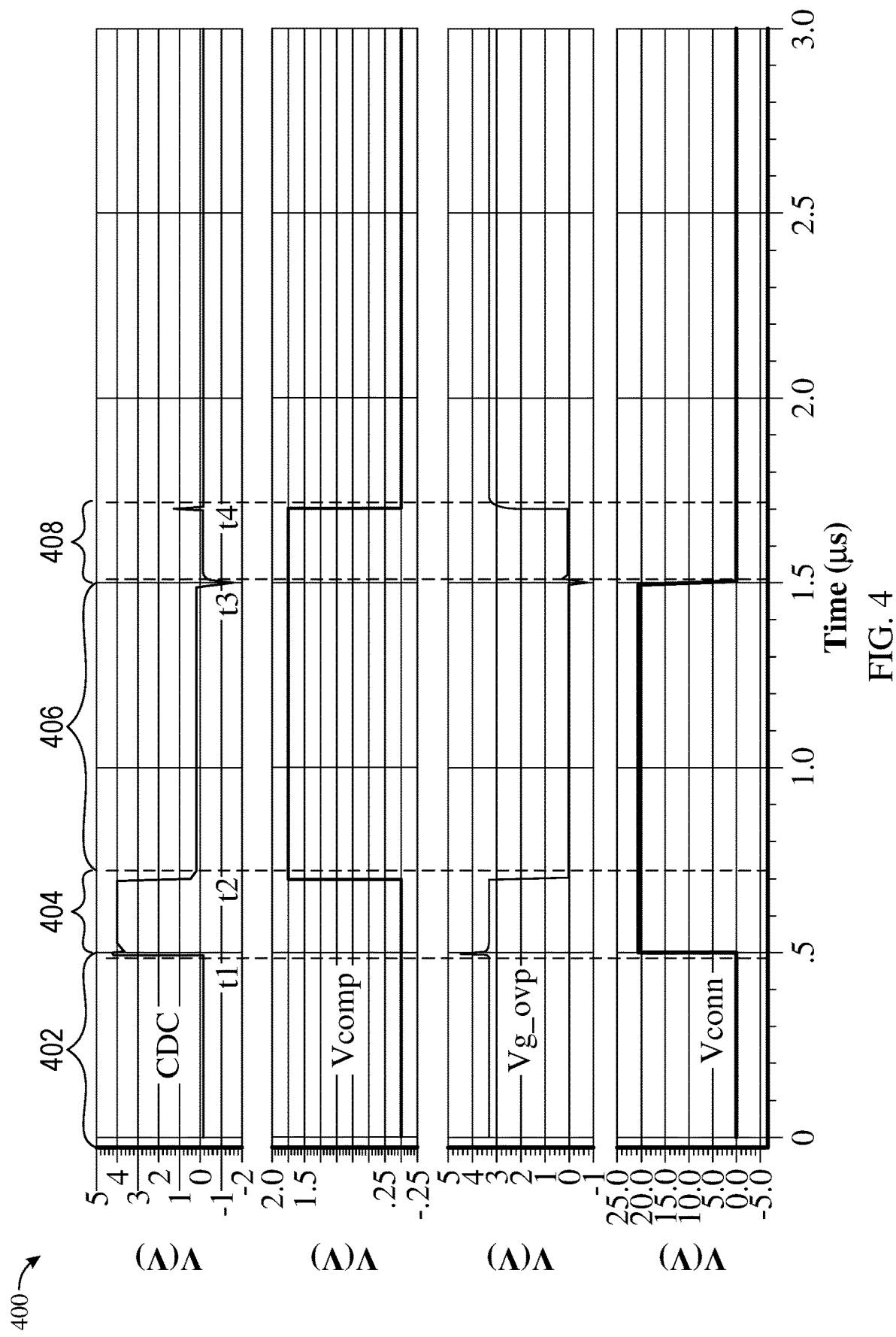
FIG. 4 is an example timing diagram illustrating various voltage waveforms for the OVP circuit of FIG. 3 before, during, and after an overvoltage event, in accordance with certain aspects of the present disclosure.

In operation, the FET M1 is used to protect against high voltage (e.g., 20 V). FIG. 4 is an example timing diagram 400 illustrating CDC, Vcomp, Vg_ovp, and Vconn voltage waveforms for the OVP circuit 300 of FIG. 3 before, during, and after an overvoltage event, in accordance with certain aspects of the present disclosure. As shown, the various voltage waveforms (CDC, Vcomp, Vg_ovp, and Vconn) are depicted as voltages over time. During Phase 1 (402) starting shortly after t1 when Vconn experiences the overvoltage event (e.g., a sudden increase in voltage to 20 V), snapback clamps SBC1 and SBC2 kick in and limit transient voltages on the IC pins CDC and Vg_ovp to their respective holding voltages (e.g., <~4.7 V). During Phase 2 (404) between t1 and t2, high-resistance resistor 308 along with snapback clamp SBC1 limits the CDC pin voltage to the SBC holding voltage. After a control circuit delay (e.g., ~200 ns due to the comparator 318 and the inverter 322), Phase 3 (406) begins at t2. During Phase 3 (406) from t2 to t3, Vg_ovp is pulled to ground (0 V) by Vcomp transitioning to a logic high signal and the inverter 322 inverting this to a logic low signal, such that NMOS transistor M1 is turned off and the CDC pin is disconnected from the connector port 302 to protect the CDC pin from Vconn's overvoltage condition. Also due to Vcomp transitioning to a logic high signal, NMOS transistor M2 turns on and pulls the CDC pin voltage to ground. The control circuit 316 maintains this state as long as Vconn*R2/(R1+R2)>Vref. After the overvoltage event stops at t3, Phase 4 (408) begins. After a control circuit delay during Phase 4, the control circuit turns off transistor M2 and turns on transistor M1, ending Phase 4 at t4.

Figure 5:
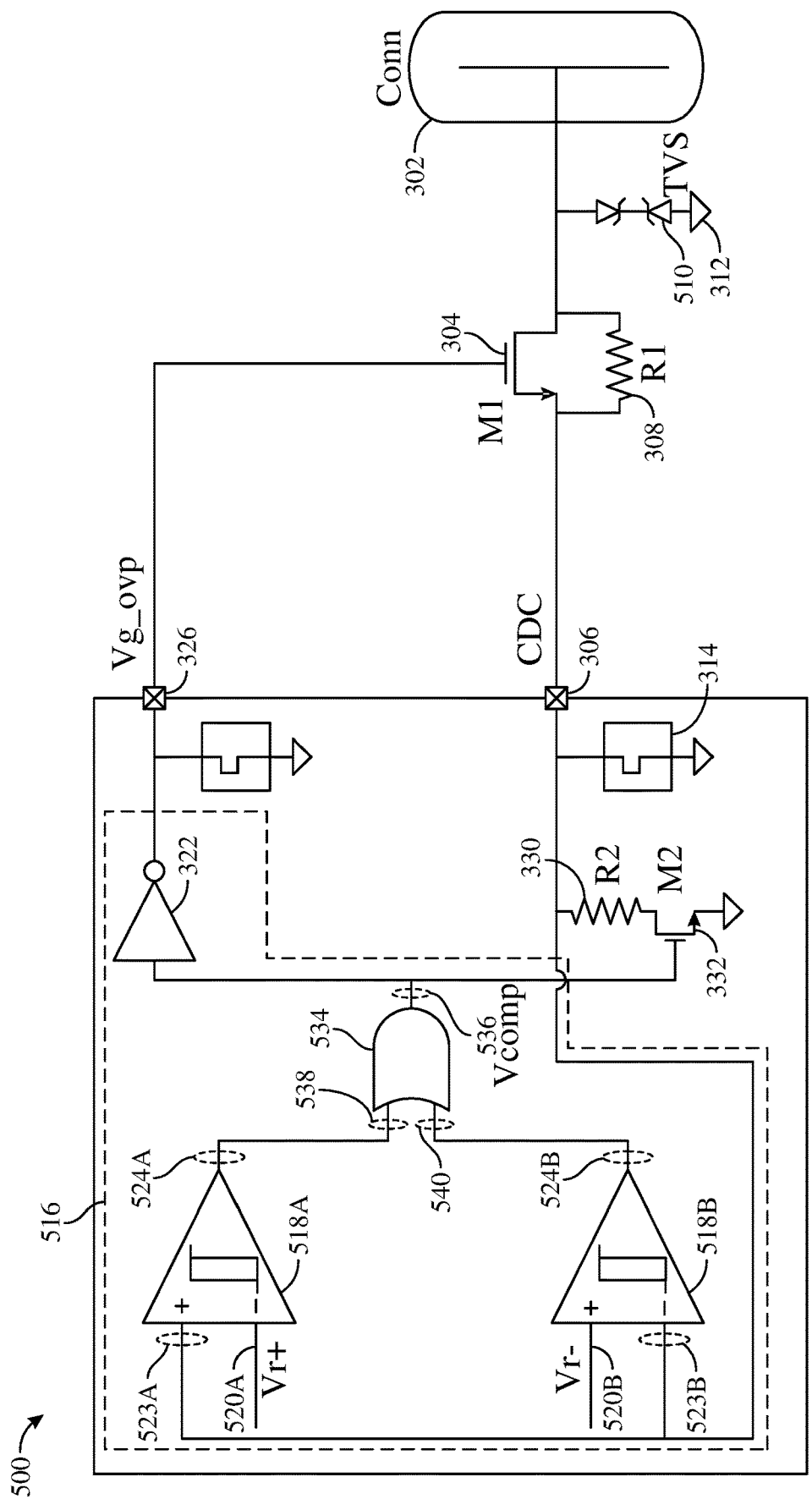
FIG. 5 is a circuit diagram of another example OVP circuit, in accordance with certain aspects of the present disclosure.

In certain aspects, the OVP circuit may provide overvoltage protection for positive and/or negative voltages. For example, FIG. 5 is a circuit diagram of another example OVP circuit 500, in accordance with certain aspects of the present disclosure. The OVP circuit 500 may be used for connector pins that support both positive and negative signal voltages and transient surge conditions. The OVP circuit 500 may include a bidirectional voltage-clamping circuit 510 (e.g., two unidirectional TVS diodes in anti-series, as illustrated). The bidirectional voltage-clamping circuit 510 may shunt transient positive or negative overvoltages to ground when the magnitude of Vconn exceeds the breakdown voltage of either of the TVS diodes.

The OVP circuit 500 may also include a control circuit 516 having a first comparator 518A, a second comparator 518B, and a logical OR gate 534, which may effectively replace the comparator 318 in FIG. 3. The logical OR gate 534 may have an output 536 coupled to an output of the control circuit 516. The first comparator 518A may have a first input 523A coupled to the signal node 306, a second input 520A (also referred to as a "first reference voltage node") configured to receive a first reference voltage (e.g., Vr+, which may be a positive voltage), and an output 524A coupled to a first input 538 of the logical OR gate. The second comparator 518B may have a first input 523B coupled to the signal node 306, a second input 520B (also referred to as a "second reference voltage node") configured to receive a second reference voltage (e.g., Vr−, which may be a negative voltage), and an output 524B coupled to a second input 540 of the logical OR gate 534. The first comparator 518A may detect a positive overvoltage relative to the first reference voltage (e.g., >Vr+) and turn off the switch 304, whereas the second comparator 518B may detect a negative overvoltage relative to the second reference voltage (e.g., <Vr−) and turn off the switch 304. In this manner, the control circuit may detect whether a magnitude of the voltage at the signal node 306 is greater than or equal to a magnitude of the first reference voltage or a magnitude of the second reference voltage.

While the examples depicted in FIGS. 3 and 5 are described herein with respect to providing OVP for positive voltages or for positive and negative voltages to facilitate understanding, aspects of the present disclosure may also be applied to an OVP circuit that protects only against negative overvoltages.

Figure 6:
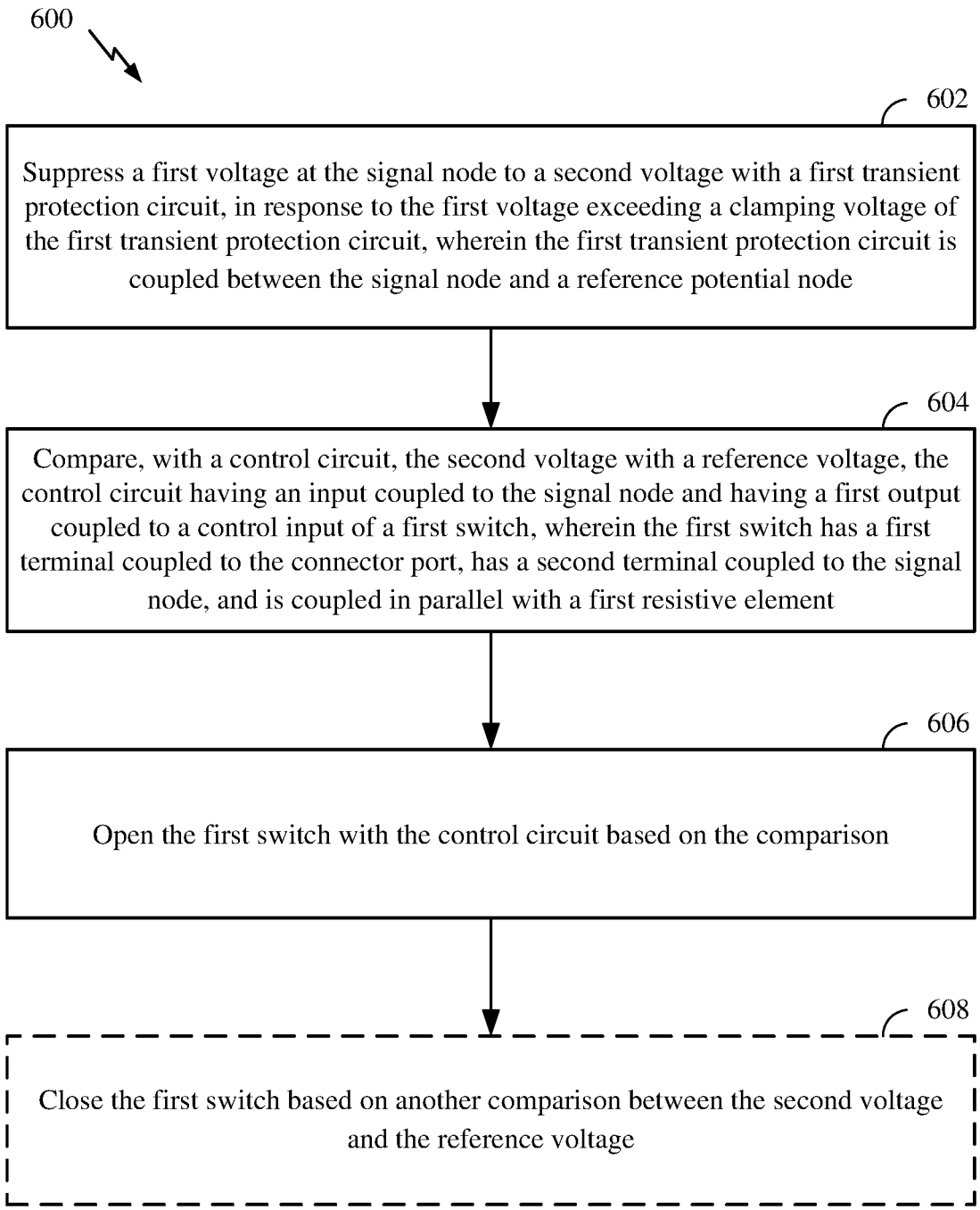
FIG. 6 is a flow diagram illustrating example operations for providing OVP for a signal node corresponding to a connector port, in accordance with certain aspects of the present disclosure.

FIG. 6 is a flow diagram illustrating example operations 600 for providing OVP for a signal node (e.g., the signal node 306) corresponding to a connector port (e.g., the connector port 302), in accordance with certain aspects of the present disclosure. The operations 600 may be performed, for example, by an OVP circuit (such as the OVP circuit 300 or the OVP circuit 500).

The operations 600 may begin at block 602, where a first transient protection circuit (e.g., the first transient protection circuit 314) may suppress a first voltage at a signal node (e.g., the signal node 306) to a second voltage, in response to the first voltage exceeding a clamping voltage of the first transient protection circuit. The first transient protection circuit may be coupled between the signal node and a reference potential node (e.g., the reference potential node 312). At block 604, a control circuit (e.g., the control circuit 316) may compare the second voltage with a reference voltage (e.g., Vref). The control circuit may have an input (e.g., the input 323) coupled to the signal node and a first output (e.g., the output 324) coupled to a control input of a first switch (e.g., the switch 304). The first switch may have a first terminal coupled to the connector port and a second terminal coupled to the signal node, and the first switch may be coupled in parallel with a first resistive element (e.g., resistor 308). At block 606, the control circuit may open the first switch based on the comparison. For example, the comparison may involve detecting that a magnitude of the second voltage is greater than or equal to a magnitude of the reference voltage.

At optional block 608, the control circuit may close the first switch based on another comparison between the second voltage and the reference voltage. In this case, the second voltage for the other comparison may be sensed through the first resistive element coupled in parallel with the first switch. In other words, the first resistive element may be used to monitor the connector port until the overvoltage condition is gone, such that the first switch may then be closed.

With respect to block 602, the first transient protection circuit may initiate the suppression of the first voltage in response to the first voltage exceeding (a magnitude of) the clamping voltage of the first transient protection circuit. The first voltage may be suppressed at block 602 for positive or negative voltages. In aspects, the clamping voltage may be a breakdown voltage of a snapback clamp. The first transient protection circuit may pull overvoltages down (or up) to certain holding voltages associated with the first transient protection circuit.

In certain aspects, a second transient protection circuit (e.g., the second transient protection circuit 328) may be used to suppress transient voltages from electrically stressing the first switch. For example, the operations 600 may further include the second transient protection circuit suppressing a third voltage at the control input of the first switch to a fourth voltage, in response to the third voltage exceeding a clamping voltage of the second transient protection circuit. The second transient protection circuit may be coupled between the control input of the first switch and the reference potential node.

In certain aspects, a second switch (e.g., the other switch 332) may be used to further suppress the voltage at the signal node. For example, the operations 600 may further include the control circuit closing the second switch based on the comparison (e.g., detecting that a magnitude of the second voltage is greater than or equal to a magnitude of the reference voltage). The second switch may be coupled in series with a second resistive element (e.g., the resistor 330) between the signal node and the reference potential node. The output of the control circuit may be coupled to a control input of the second switch.

In certain aspects, the comparison may be performed with a comparator (e.g., the comparator 318). For example, the comparison at block 604 may include the comparator comparing the second voltage with the reference voltage. In this case, the comparator may have a first input coupled to the signal node, have a second input receiving the reference voltage, and have an output coupled to the first output of the control circuit.

In certain aspects, control voltage output by the comparator may be inverted with an inverter (such as the inverter 322). For example, opening the first switch at block 606 may include applying an inverted output of the comparator to the control input of the first switch.

In aspects, the reference voltage of the comparator may be different than a holding voltage of the first transient protection circuit. For example, a magnitude of the holding voltage may be greater than the reference voltage in order to enable the control circuit to trigger the opening of the first switch.

In certain aspects, a TVS (e.g., the TVS 310, which may be implemented by a TVS diode) may be used to further suppress transient voltages. For example, suppressing the first voltage at block 602 may also include suppressing the first voltage to the second voltage further with a TVS diode coupled between the first terminal of the first switch and the reference potential node.

In certain aspects, the first resistive element may be used to monitor the voltage at the connector pin until the overvoltage condition has ended. The control circuit may close the first switch based on another comparison between the second voltage and the reference voltage. For example, the second voltage for the other comparison may be sensed through the first resistive element coupled in parallel with the first switch and/or through the second resistive element coupled in series with the second switch. With respect to the operations 600, comparing the second voltage at block 604 may include comparing the second voltage with the reference voltage based at least in part on a first voltage drop across the first resistive element coupled in parallel with the first switch, and in certain cases, a second voltage drop across the second resistive element coupled in series with the second switch. The control circuit may compare whether the Vconn*R2/(R1+R2) is greater than the reference voltage (Vref). When Vconn*R2/(R1+R2) is greater than the reference voltage, the control circuit may open the first switch, and when Vconn*R2/(R1+R2) is less than or equal to the reference voltage, the control circuit may close the first switch.

In aspects, the control circuit may close the first switch when the overvoltage event stops. As an example, the control circuit may close the first switch based on the comparison, such as detecting that a magnitude of the second voltage is less than a magnitude of the reference voltage.

With respect to block 608, the control circuit may close the first switch if the second voltage is below a certain threshold based on the reference voltage, for example, as described herein with respect to FIG. 4 following Phase 4. As an example, if Vconn*R2/(R1+R2) is less than or equal to Vref, the control circuit may close the first switch, and in certain cases, the control circuit may open the second switch.

EXAMPLE ASPECTS

In addition to the various aspects described above, specific combinations of aspects are within the scope of the disclosure, some of which are detailed below:

Aspect 1: A circuit for overvoltage protection (OVP) between a connector port and a signal node corresponding to the connector port, the OVP circuit comprising: a first switch having a first terminal for coupling to the connector port and having a second terminal for coupling to the signal node; a first resistive element coupled in parallel with the first switch; a first transient protection circuit coupled between the signal node and a reference potential node; and a control circuit having an input coupled to the signal node and having a first output coupled to a control input of the first switch.

Aspect 2: The OVP circuit of Aspect 1, further comprising a second transient protection circuit coupled between the control input of the first switch and the reference potential node.

Aspect 3: The OVP circuit of Aspect 2, wherein at least one of the first transient protection circuit or the second transient protection circuit comprises a snapback clamp.

Aspect 4: The OVP circuit of Aspect 2, wherein at least one of the first transient protection circuit or the second transient protection circuit comprises at least one diode coupled in series with a resistive-capacitive (RC) clamp.

Aspect 5: The OVP circuit according to any of Aspects 1-4, further comprising a second resistive element and a second switch coupled in series between the signal node and the reference potential node, wherein a second output of the control circuit is coupled to a control input of the second switch.

Aspect 6: The OVP circuit of Aspect 5, wherein the first resistive element has a first resistance that is greater than a second resistance of the second resistive element by at least an order of magnitude.

Aspect 7: The OVP circuit according to any of Aspects 1-6, wherein the control circuit comprises a comparator having a first input coupled to the signal node, having a second input configured to receive a reference voltage, and having an output coupled to the output of the control circuit.

Aspect 8: The OVP circuit of Aspect 7, wherein the control circuit further comprises an inverter having an input coupled to the output of the comparator and having an output coupled to the first output of the control circuit.

Aspect 9: The OVP circuit of Aspects 7 or 8, further comprising a second resistive element and a second switch coupled in series between the signal node and the reference potential node, wherein the output of the comparator is coupled to a control input of the second switch.

Aspect 10: The OVP circuit according to any of Aspects 7-9, wherein a magnitude of a reference voltage at the reference voltage node is lower than a magnitude of a holding voltage of the first transient protection circuit.

Aspect 11: The OVP circuit according to any of Aspects 1-10, wherein the connector port is a USB-C port.

Aspect 12: The OVP circuit of Aspect 11, wherein the USB-C port is a differential pair positive (DP) port, a differential pair negative (DN) port, or a sideband use (SBU) port.

Aspect 13: The OVP circuit according to any of Aspects 1-12, wherein the OVP circuit lacks a sense line coupled to a node between the first terminal of the first switch and the connector port.

Aspect 14: The OVP circuit according to any of Aspects 1-13, wherein the first switch comprises an n-type metal-oxide-semiconductor (NMOS) transistor having a drain as the first terminal of the first switch, having a source as the second terminal of the first switch, and having a gate as the control input of the first switch.

Aspect 15: The OVP circuit of Aspect 14, wherein a breakdown voltage of the NMOS transistor is at least 20 V.

Aspect 16: The OVP circuit according to any of Aspects 1-15, wherein: the control circuit is part of an integrated circuit (IC); the first switch is external to the IC; the signal node includes a pin of the IC; the OVP circuit comprises only a single additional pin of the IC for the overvoltage protection of the connector port; and the single additional pin is coupled between the first output of the control circuit and the control input of the first switch.

Aspect 17: The OVP circuit of Aspect 16, wherein the first resistive element is external to the IC.

Aspect 18: The OVP circuit of Aspects 16 or 17, wherein the first transient protection circuit is internal to the IC.

Aspect 19: The OVP circuit according to any of Aspects 1-18, further comprising a transient voltage suppression (TVS) diode coupled between the first terminal of the first switch and the reference potential node.

Aspect 20: The OVP circuit of according to any of Aspects 1-6 or 10-19, wherein the control circuit comprises: a logical OR gate having an output coupled to the first output of the control circuit; a first comparator having a first input coupled to the signal node, having a second input configured to receive a first reference voltage, and having an output coupled to the first input of the logical OR gate; and a second comparator having a first input coupled to the signal node, having a second input configured to receive a second reference voltage, and having an output coupled to the second input of the logical OR gate.

Aspect 21: The OVP circuit of Aspects 5 or 6, wherein the second output of the control circuit is the same as the first output of the control circuit.

Aspect 22: The OVP circuit of Aspects 5 or 6, wherein the second output of the control circuit is coupled to the first output of the control circuit.

Aspect 23: A method of providing overvoltage protection between a connector port and a signal node corresponding to the connector port, the method comprising: suppressing a first voltage at the signal node to a second voltage with a first transient protection circuit, in response to the first voltage exceeding a clamping voltage of the first transient protection circuit, wherein the first transient protection circuit is coupled between the signal node and a reference potential node; comparing, with a control circuit, the second voltage with a reference voltage, the control circuit having an input coupled to the signal node and having a first output coupled to a control input of a first switch, wherein the first switch has a first terminal coupled to the connector port, has a second terminal coupled to the signal node, and is coupled in parallel with a first resistive element; and opening the first switch with the control circuit based on the comparison.

Aspect 24: The method of Aspect 23, further comprising suppressing a third voltage at the control input of the first switch to a fourth voltage with a second transient protection circuit coupled between the control input of the first switch and the reference potential node, in response to the third voltage exceeding a clamping voltage of the second transient protection circuit.

Aspect 25: The method of Aspect 23 or 24, further comprising closing, with the control circuit, a second switch based on the comparison, wherein the second switch is coupled in series with a second resistive element between the signal node and the reference potential node and wherein a second output of the control circuit is coupled to a control input of the second switch.

Aspect 26: The method of Aspect 25, wherein closing the second switch comprises closing the second switch based on the comparison detecting that a magnitude of the second voltage is greater than or equal to a magnitude of the reference voltage.

Aspect 27: The method according to any of Aspects 23-26, wherein the comparing comprises comparing, with a comparator, the second voltage with the reference voltage, the comparator having a first input coupled to the signal node, having a second input receiving the reference voltage, and having an output coupled to the first output of the control circuit.

Aspect 28: The method of Aspect 27, wherein opening the first switch comprises applying an inverted output of the comparator to the control input of the first switch.

Aspect 29: The method according to any of Aspects 23-28, wherein the reference voltage is different than a holding voltage of the first transient protection circuit.

Aspect 30: The method according to any of Aspects 23-29, wherein suppressing the first voltage comprises suppressing the first voltage to the second voltage further with a transient voltage suppression (TVS) diode coupled between the first terminal of the first switch and the reference potential node.

Aspect 31: The method according to any of Aspects 23-30, further comprising closing, with the control circuit, the first switch based on another comparison between the second voltage and the reference voltage, wherein the second voltage for the other comparison is sensed through the first resistive element coupled in parallel with the first switch.

Aspect 32: The method according to any of Aspects 23-31, wherein opening the first switch comprises opening the first switch based on the comparison detecting that a magnitude of the second voltage is greater than or equal to a magnitude of the reference voltage.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A circuit for overvoltage protection (OVP) between a connector port and a signal node corresponding to the connector port, the OVP circuit comprising:
    a first switch having a first terminal for coupling to the connector port and having a second terminal for coupling to the signal node;
    a first resistive element coupled in parallel with the first switch;
    a first transient protection circuit coupled between the signal node and a reference potential node;
    a control circuit having an input coupled to the signal node and having a first output coupled to a control input of the first switch; and
    a second transient protection circuit coupled between the control input of the first switch and the reference potential node.

2. The OVP circuit of claim 1, wherein at least one of the first transient protection circuit or the second transient protection circuit comprises a snapback clamp.

3. The OVP circuit of claim 1, wherein at least one of the first transient protection circuit or the second transient protection circuit comprises at least one diode coupled in series with a resistive-capacitive (RC) clamp.

4. The OVP circuit of claim 1, wherein the control circuit comprises a comparator having a first input coupled to the signal node, having a second input coupled to a reference voltage node, and having an output coupled to the first output of the control circuit.

5. The OVP circuit of claim 4, wherein the control circuit further comprises an inverter having an input coupled to the output of the comparator and having an output coupled to the first output of the control circuit.

6. The OVP circuit of claim 5, further comprising a second resistive element and a second switch coupled in series between the signal node and the reference potential node, wherein the output of the comparator is coupled to a control input of the second switch.

7. The OVP circuit of claim 4, wherein a magnitude of a reference voltage at the reference voltage node is lower than a magnitude of a holding voltage of the first transient protection circuit.

8. The OVP circuit of claim 1, wherein the connector port is a USB-C port.

9. The OVP circuit of claim 8, wherein the USB-C port is a differential pair positive (DP) port, a differential pair negative (DN) port, or a sideband use (SBU) port.

10. The OVP circuit of claim 1, wherein the OVP circuit lacks a sense line coupled to a node between the first terminal of the first switch and the connector port.

11. The OVP circuit of claim 1, wherein the first switch comprises an n-type metal-oxide-semiconductor (NMOS) transistor having a drain as the first terminal of the first switch, having a source as the second terminal of the first switch, and having a gate as the control input of the first switch.

12. The OVP circuit of claim 11, wherein a breakdown voltage of the NMOS transistor is at least 20 V.

13. The OVP circuit of claim 1, comprising a transient voltage suppression (TVS) diode coupled between the first terminal of the first switch and the reference potential node.

14. The OVP circuit of claim 1, wherein the control circuit comprises:
- a logical OR gate having an output coupled to the first output of the control circuit;
- a first comparator having a first input coupled to the signal node, having a second input coupled to a first reference voltage node, and having an output coupled to a first input of the logical OR gate; and
- a second comparator having a first input coupled to the signal node, having a second input coupled to a second reference voltage node, and having an output coupled to a second input of the logical OR gate.

15. A circuit for overvoltage protection (OVP) between a connector port and a signal node corresponding to the connector port, the OVP circuit comprising:
- a first switch having a first terminal for coupling to the connector port and having a second terminal for coupling to the signal node;
- a first resistive element coupled in parallel with the first switch;
- a first transient protection circuit coupled between the signal node and a reference potential node;
- a control circuit having an input coupled to the signal node and having a first output coupled to a control input of the first switch; and
- a second resistive element and a second switch coupled in series between the signal node and the reference potential node, wherein a second output of the control circuit is coupled to a control input of the second switch.

16. The OVP circuit of claim 15, wherein the first resistive element has a first resistance that is greater than a second resistance of the second resistive element by at least an order of magnitude.

17. A circuit for overvoltage protection (OVP) between a connector port and a signal node corresponding to the connector port, the OVP circuit comprising:
- a first switch having a first terminal for coupling to the connector port and having a second terminal for coupling to the signal node;
- a first resistive element coupled in parallel with the first switch;
- a first transient protection circuit coupled between the signal node and a reference potential node; and
- a control circuit having an input coupled to the signal node and having a first output coupled to a control input of the first switch;

wherein:
the control circuit is part of an integrated circuit (IC);
the first switch is external to the IC;
the signal node includes a pin of the IC;
the OVP circuit comprises only a single additional pin of the IC for the overvoltage protection of the connector port; and
the single additional pin is coupled between the first output of the control circuit and the control input of the first switch.

18. The OVP circuit of claim 17, wherein the first resistive element is external to the IC.

19. The OVP circuit of claim 17, wherein the first transient protection circuit is internal to the IC.

* * * * *